United States Patent [19]

Anders

[11] 4,347,003
[45] Aug. 31, 1982

[54] TWO-STAGE EXTRUDER
[75] Inventor: Dietmar Anders, Hanover, Fed. Rep. of Germany
[73] Assignee: Hermann Berstorff Maschinenbau GmbH, Hanover, Fed. Rep. of Germany
[21] Appl. No.: 158,281
[22] Filed: Jun. 10, 1980
[30] Foreign Application Priority Data
Jun. 15, 1979 [DE] Fed. Rep. of Germany ....... 2924317
[51] Int. Cl.³ .......................... A21C 1/10; B28C 7/16; B29F 3/01
[52] U.S. Cl. ....................................... 366/75; 366/77; 366/83; 366/91; 366/193; 366/307
[58] Field of Search ....................... 366/77, 79, 75, 81, 366/83–86, 87, 90, 91, 99, 100, 192, 193, 292, 302, 303, 305, 307, 318, 319, 325; 425/205, 207, 208

[56] References Cited
U.S. PATENT DOCUMENTS

| | | | |
|---|---|---|---|
| 1,486,328 | 3/1924 | Fraser | 366/77 |
| 3,392,962 | 7/1968 | Fritsch et al. | 366/81 |
| 3,729,178 | 4/1973 | Stade | 366/324 |
| 3,749,375 | 7/1973 | Hermann et al. | 366/83 |
| 4,199,263 | 4/1980 | Menges et al. | 366/307 |

Primary Examiner—Philip R. Coe
Assistant Examiner—Timothy F. Simone
Attorney, Agent, or Firm—Schwartz, Jeffery, Schwaab, Mack, Blumenthal & Koch

[57] ABSTRACT

A two-stage extruder having a first, vertical stage and a second, separately driven, horizontal stage, the two stages being off-set from one another and lying at tangents to one another in the region of a connecting passage. The first stage has a rotatable plasticizing member with kneading blades off-set from one another and located between conveying screw components of said member and cylindrical pins projecting into the working chamber of said first stage. A bearing is provided for the member at its upper end and a cylindrical sleeve surrounds the lower end of the member and can be turned to control the effective size of the connecting passage or to eject material through a second outlet.

5 Claims, 3 Drawing Figures

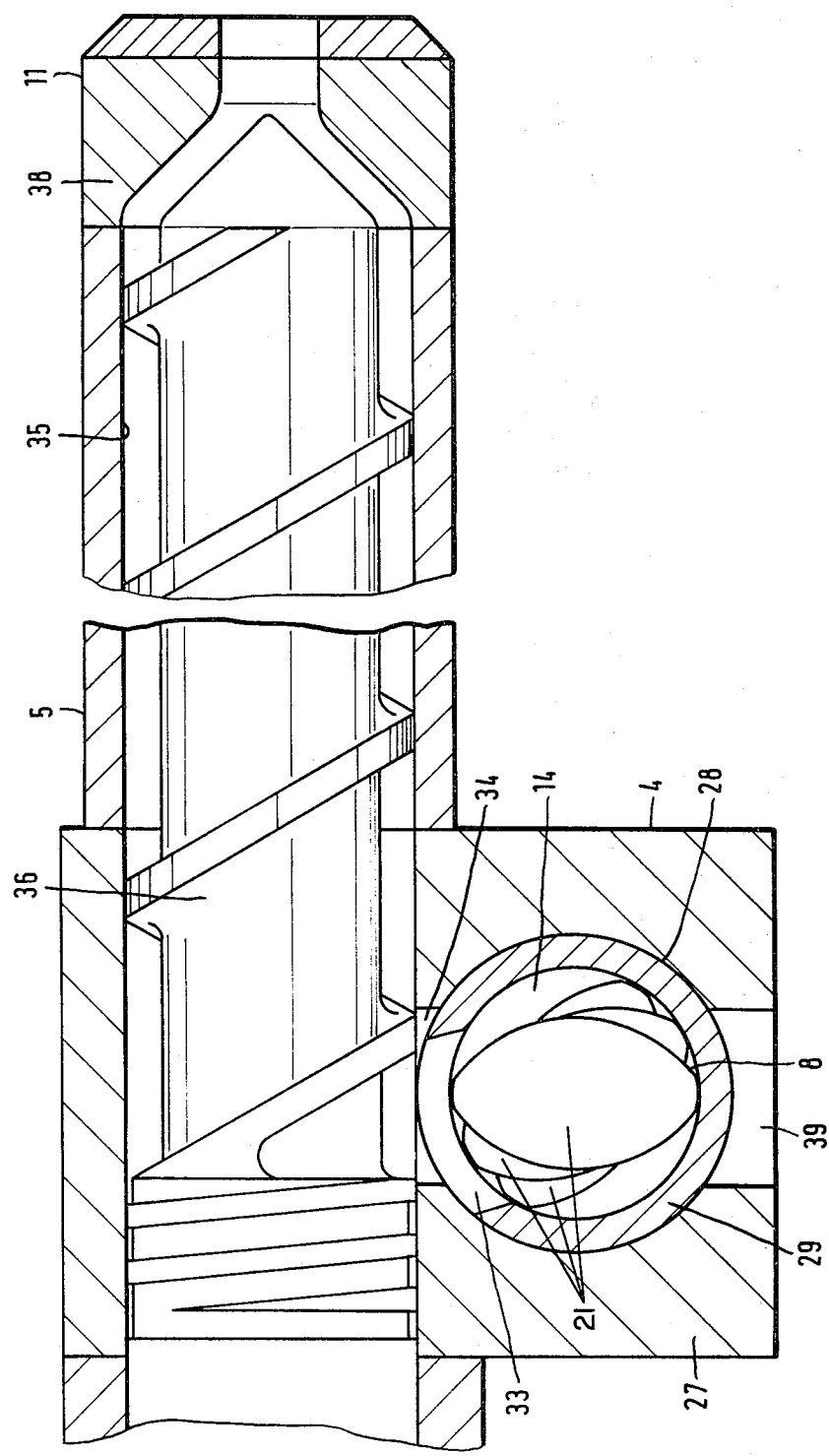

TWO-STAGE EXTRUDER

BRIEF SUMMARY OF THE INVENTION

The invention relates to a two-stage extruder particularly though not exclusively for powdered plastic materials.

A two-stage extruder for such materials has been previously proposed comprising a vertically disposed screw conveyor and a horizontally disposed screw conveyor. The two conveyors are connected sequentially in the direction of flow of the material. The connection between the working chambers of the two conveyors, which chambers are off-set from one another, is located in the region of a junction where the two working chambers lie each at a tangent to the other.

The powdered moulding material is fed into the vertical screw conveyor, moved downwards by its conveying screw, which rotates within a bore in a housing thereof, and is pre-plasticised by the action of pressure and heat. At the end of the working region of the first stage the pre-plasticised moulding material is passed through a connecting passage into the horizontal screw conveyor. The screw of the horizontal conveyor is designed to compress and extrude the plasticised material.

In order to provide different working conditions for different types of moulding material, the vertical conveying screw has a conical shoulder at its lower end; this interacts with a conical part of the conveyor housing, forming a throttling station, whereby the passage of the moulding material from the first processing stage to the second can be controlled.

The moulding material is fed into this previously proposed two-stage extruder from a full hopper, so that the extruder operates with full screw channels. This means that there is always a maximum shearing energy input through the full channels. In order to avoid inadmissible heating of the molten material it is necessary to restrict the rotary speed of the screw to relatively low values rather than exploit the maximum possible speed. Thus with the previously proposed extruder it is not possible to achieve the high throughput nowadays required while ensuring adequate plasticising and homogenising of the final product. Particular moulding materials with added substances which are difficult to disperse, such as colour pigments, have produced poor quality end products.

The invention has among its objects to provide a two-stage extruder wherein final products of adequate quality can be obtained with a high throughput.

According to the invention, there is provided a two-stage extruder for thermoplastic moulding materials comprising two separately driven extruding stages at right angles to one another, a first of the stages being disposed vertically and a second of the stages being disposed horizontally with working chambers of the two extruding stages off-set from one another and lying each at a tangent to the other in the region of their junction, at which junction a connecting passage is provided between the two working chambers; a rotatable plasticising member for the vertical extruding stage has kneading blades off-set from one another and located between conveying screw components of said member; cylindrical pins project into the working chamber of the vertical extruding stage; and a bearing mounts said plasticising member rotatably at its upper end.

The extruder of the invention is particularly though not exclusively suitable for processing synthetic plastics material fed to it in powder form.

The arrangement of the kneading blades can provide free mixing chambers in which, by interaction with the cylindrical pins, more thorough mixing and the input of more shearing energy is possible even when the screw channels are only partially filled. The moulding material to be processed is constantly being picked up and re-layered. Even colour pigments which are difficult to disperse can be spread reliably and blended evenly into the thermoplastic moulding material. Since the construction of the vertical extruding stage can enable strong shearing energy to be exerted on the moulding material even when the screw channels are only partly filled, the extruder can be run at very high speeds and thus with a high throughput.

Kneading blades are known from their use in double screw extruders. The function of kneading blades is to draw the moulding material into a wedge. The moulding material flowing through the shearing gaps is subjected to shearing action. As the kneading blades have a finite width, melt flows away in an axial direction on both sides of the blade. A plurality of kneading blades are always arranged axially in succcession and off-set at an angle from one another, so that molten material can flow off into adjacent passages on both sides of each blade. This gives an excellent mixing action from passage to passage. Depending on the arrangement of the off-set kneading blades, rotation of the blades will give a positive or negative axial conveying action.

The advantageous effect of the cylindrical pins lies in preventing the pre-compressed moulding material from turning with the plasticising member, so that the shearing and conveying effect of the kneading blades and conveying screw components can come into action.

The upper bearing for the vertical plasticising member enables the member to turn at high speeds. It can thus be prevented from running against the inner wall of the cylinder, and wear can be reduced. In addition, the upper journal of the plasticising member may be used to support agitating components or pre-compressing components in a feed hopper.

Providing the cylindrical pins to be adjustable can permit variation in the distance between the inner end of the pin and the perimeter of the screw-free annular portion of said member opposite the pin in question or of the appropriate circular disc between the kneading blades. The cylindrical pins are adjusted to a wider or narrower spacing according to the properties of the moulding material to be processed.

Advantageously the vertical plasticising member has kneading blades in the region of the junction between the extruding stages, such blades being off-set from one another in the counter-conveying direction. This can facilitate the transfer of the plasticised moulding material and prevent any particles of material from penetrating towards a lower axial pressure bearing for said member.

The extruder preferably includes an adjustable throttling means before the connecting passage in the region of the junction between the two extruding stages, said means comprising a rotatable cylindrical sleeve surrounding the plasticising member and having a discharge orifice therein. Such a rotatable cylindrical sleeve can permit control of the pressure of the material and thus the residence time of the material, the intensity of shearing and the temperature of the material. The discharge orifice in the cylindrical sleeve is brought more or less into registry with the connecting passage in the region of the junction of the two extruding stages, thus affecting the pressure in the vertical extruding stage. This varies the cross-section of the passage for the moulding material entering the horizontal stage.

Preferably the discharge orifice in the cylindrical sleeve can be brought into registry with a second outlet from the vertical extruding stage. This enables the cylindrical sleeve controlling the operating pressure in the first extruding stage also to be used as a starting up valve. When the extruder is being started up the opening in the cylindrical sleeve is brought into registry with the second outlet in the region of the junction. The moulding material conveyed passes out of the second outlet and for example to a waste bin. When the material emerging is sufficiently plasticised, the cylindrical sleeve is turned so that the opening therein is brought into registry with the passage connecting the two extruding stages. The moulding material now extruded is fully plasticised and can be fed to the downstream processing means.

The invention can make it possible for moulding materials in powder or granulate form and particularly synthetic materials to be processed in separate stages with a high throughput. In the first, high speed, vertical extruding stage the raw material is fed in, compressed, conveyed, fused by the application of shearing energy and homogenised. In the horizontal extruding stage the material is temperature controlled, fully homogenised and extruded.

The invention is diagrammatically illustrated by way of example with reference to the accompanying drawings, from which for clarity components which are not necessary to an understanding of the invention have been omitted, in which:

BRIEF DESCRIPTION OF THE DRAWINGS

FIG. 3 is a cross-section taken on line III—III of FIG. 1.

DETAILED DESCRIPTION

Figure 1:
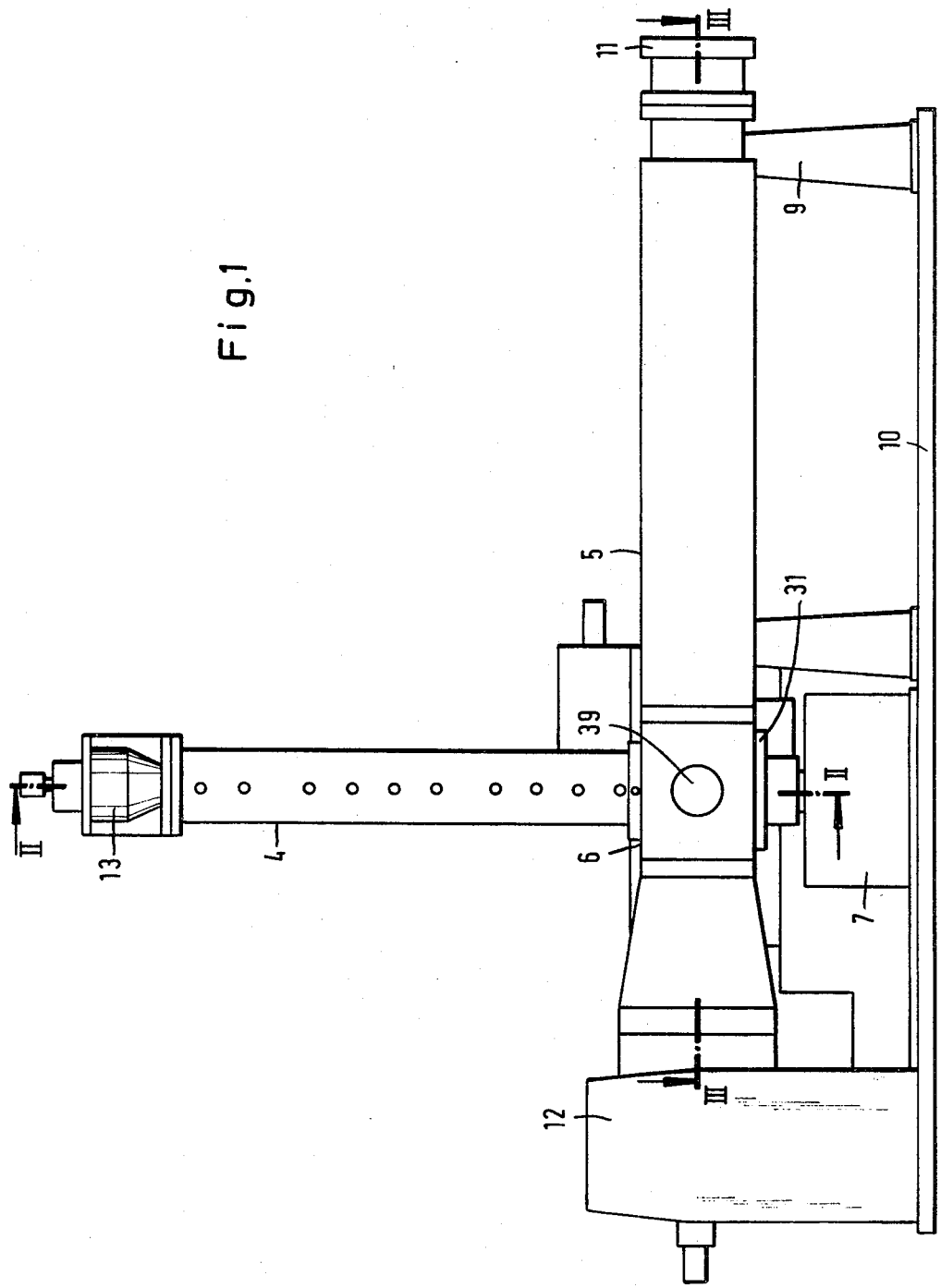
FIG. 1 is a diagrammatic representation of a two-stage extruder according to the invention with a vertical and a horizontal extruding stage.

Referring to the drawings, an extruder has a vertically disposed extruding stage 4 as a first processing stage and, normal to the vertical extruding stage 4 and off-set therefrom, a second horizontal extruding stage 5. The two stages have a common junction 6 at which they communicate to allow material to pass from one stage to the next. The stages are radially offset from each other at the junction 6 in that their axes do not intersect there. In fact, the stages are disposed tangentially to one another at junction 6 in that the outer surface of each stage tangentially meets the outer surface of the other stage there.

The vertical extruding stage 4 extends upwardly from a housing 7, in which a motor, a mechanism for driving a rotatable plasticising member 8 and bearings for the member 8 are accommodated. The horizontal extruding stage 5 is supported on a base plate 10 by means of a support 9, and is driven by a drive unit 12 at the end opposite an output end 11.

The vertical stage 4 has a feed hopper 13 for the powdered moulding material at its upper end. The powdered moulding material is fed from a storage bin 30 to the hopper 13 by means of a dosing screw 20.

Figure 2:
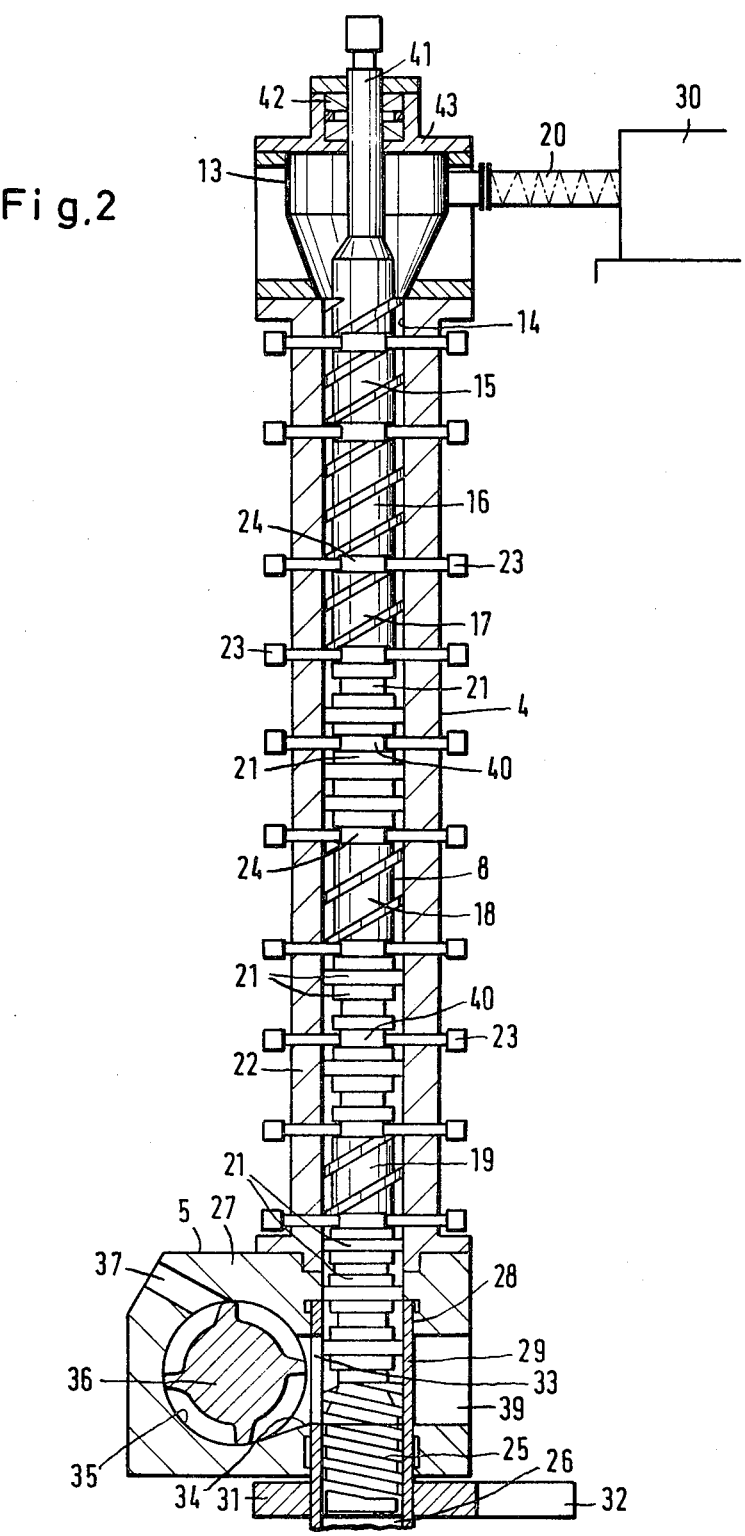
FIG. 2 is a cross-section on line II—II of FIG. 1.

The plasticising member 8, which is rotatable in a bore 14 of a cylindrical housing 22 of the vertical stage 4, has conveying screw components 15 to 19, with oval, elliptical or triangular kneading blades 21 arranged between them as shown in FIGS. 2 and 3. The kneading blades 21 are turned relative to one another so as to be offset circumferentially of the working chamber (see FIG. 3), enabling the moulding material to be transported in the conveying direction or the counter-conveying direction. Cylindrical pins 23 extend radially into the cylindrical housing 22 of the vertical extruding stage 4. The pins 23 are distributed circumferentially around housing 22 and engage in circumferential grooves 24 between the screw components 15 to 19 or in grooves 40 between circular flanges of corresponding diameter formed between adjacent kneading blades. The grooves 40 are disposed between pairs of kneading blades 21. The moulding material, displaced in an axial direction by the blades 21, can thus bear on the cylindrical pins 23 and is prevented from rotating together with the plasticising member 8.

At the upper end the vertical plasticising member 8 has a central journal 41 extending through the feed hopper 13. The journal 41 is guided in a radial bearing 42 arranged in a housing cover 43 of the feed hopper 13.

At the lower end the plasticising member 8 has a fine-pitch returning screw thread 25 adjoined by a drive shaft 26. The cylindrical housing 22 is supported on a housing block 27 which surrounds the lower part of the plasticising member 8. A bore 28 in the housing block 27, which is aligned with the bore 14 of the housing 22, is enlarged and contains a cylindrical sleeve 29; this fits rotatably therein, its internal diameter being the same as that of the bore 14 of the housing 22.

The end of the cylindrical sleeve 29 projecting from the housing block 27 has an annular attachment 31 welded onto it. This has a lever arm 32 or adjusting drive for turning the sleeve 29.

The sleeve 29 contains an aperture which provides a discharge orifice 33. Through the orifice 33 the moulding material, pre-plasticised by the vertical extruding stage 4, can enter the horizontal extruding stage 5 via a connecting passage 34 at junction 6. A conveying screw 36 is mounted rotatably in the cylindrical bore 35 of the horizontal extruding stage 5. At the junction of the two stages 4 and 5 the housing of the horizontal stage 5 contains a venting orifice 37, communicating either with the atmosphere or with a vacuum pump.

An extrusion head 38 is flange-mounted at the output end 11 of the horizontal extruding stage 5.

Opposite the connecting passage 34 at the junction of the two stages 4 and 5 there is a second outlet 39 into the open air. This is covered by the cylindrical sleeve 29 in the position illustrated in FIGS. 2 and 3. The connecting passage 34 can be substantially fully opened up by the discharge orifice 33 in the sleeve 29.

The extruder described above operates as follows:

Synthetic material to be processed is placed in the feed hopper 13 in the form of a powder, ground material or granulate. The first screw conveyor component 15 of the plasticising member 8 draws-in the moulding material and feeds it to the shearing and mixing components 16 to 19, 21 and 23 which follow. The kneading blades 21, together with the wall of the cylindrical housing 22, alternately form chambers which narrow with a taper and have narrow shearing gaps, and expansion chambers for the moulding material. The cylindrical pins 23 extending into the housing bore 14 pick up particles of material and islands of material and provide for turbulent movement and continued thorough mixing of the moulding material and any substances added. The last screw conveyor component 19 builds up a conveying pressure which forces the now already plasticised moulding material through the connecting passage 34 into the horizontal extruding stage 5. In the transitional region of the discharge orifice 33 the kneading blades 21 convey the material in the opposite direction.

In the horizontal extruding stage 5 the moulding material is de-gassed and conveyed on towards the output end 11. It is further homogenised and its temperature evened out. The moulding material is extruded through the extrusion head 38 under pressure.

What is claimed is:

1. A two-stage extruder for thermoplastic moulding materials, said extruder comprising:
   two separate extruding stages, one of said stages being disposed horizontally and the other of said stages being disposed vertically, each of said stages having a working chamber, said chambers being in communication with each other at a common junction between the stages for allowing material to pass from the working chamber of one stage to the working chamber of the other stage, said chambers also being radially offset from each other at said junction such that the axis of each stage does intersect the axis of the other stage at said junction, said chambers meeting tangentially at said junction to form a connecting passage for said communication;
   a rotatable plasticizing member disposed in said vertical chamber of said vertical extruding stage;
   kneading blades connected to said plasticizing member, said kneading blades being disposed in groups wherein each kneading blade of each group extends radially of said vertical chamber and is circumferentially offset with respect to the next adjacent blade in the same group;
   conveying screw components formed on said plasticizing member between said groups of kneading blades;
   pins projecting radially into said working chamber of said vertical extruding stage, with certain of said pins extending between kneading blades of one group; and
   a bearing mounting said plasticizing member rotatably at its upper end.

2. A two-stage extruder as claimed in claim 1, wherein said cylindrical pins projecting into said working chamber of said vertical extruding stage are adjustable to vary their depth of penetration.

3. A two-stage extruder as claimed in claim 1, wherein said plasticising member has said kneadinhg blades in the region of said junction between the extruding stages, such blades being off-set from one another in the counter-conveying direction.

4. A two-stage extruder as claimed in claim 1, further comprising adjustable throttling means connected across said connecting passage in said region of said junction between said two extruding stages, said means comprising a rotatable cylindrical sleeve surrounding said plasticising member and having a discharge orifice therein.

5. A two-stage extruder as claimed in claim 4, wherein said vertical extruding stage has a second outlet and said discharge orifice in said cylindrical sleeve can be brought into registry with said second outlet.

* * * * *